United States Patent [19]

Palazzolo et al.

[11] Patent Number: 4,645,056
[45] Date of Patent: * Feb. 24, 1987

[54] MATERIAL FLOW RAIL

[75] Inventors: Francis V. Palazzolo; Wayne T. Polachowski, both of Sterling Heights, Mich.

[73] Assignee: Custom Automation, Inc., Roseville, Mich.

[*] Notice: The portion of the term of this patent subsequent to Sep. 17, 2002 has been disclaimed.

[21] Appl. No.: 726,842

[22] Filed: Apr. 24, 1985

Related U.S. Application Data

[62] Division of Ser. No. 575,769, Feb. 1, 1984, Pat. No. 4,541,518.

[51] Int. Cl.⁴ .............................................. B65G 13/00
[52] U.S. Cl. ..................... 193/35 A; 193/37
[58] Field of Search ...................... 193/35 A, 35 R, 37

[56] References Cited

U.S. PATENT DOCUMENTS

| | | | |
|---|---|---|---|
| 3,108,671 | 10/1963 | Fuka et al. ................ | 193/35 A |
| 3,443,674 | 5/1969 | Kornylak ................ | 193/37 |
| 4,006,810 | 2/1977 | Kornylak ................ | 193/37 |
| 4,205,740 | 6/1980 | Hammond ................ | 193/35 A |

Primary Examiner—Joseph F. Peters, Jr.
Assistant Examiner—L. E. Williams
Attorney, Agent, or Firm—Harness, Dickey & Pierce

[57] ABSTRACT

An improved material flow rail construction of the type employed to transmit containers or articles from one location to another gravity force. The improved material fow rail comprises a substantially U-shaped channel within which a multiplicity of mounting bolts are attached. Individual bearing assemblies are placed on the mounting bolts. By placing the individual bearing assemblies closely adjacent one another in a longitudinal direction with respect to the support channel, the flow rail has the ability to transmit parts having very small "footprint" areas since a large space between rollers is not presented for parts or components thereof to become caught. By providing a loose fit between the bearing inner races and the supporting mounting bolts, the inner race is permitted to rotate slightly with respect to the mounting bolts thereby presenting new wear surfaces as the flow rail is put into use. Additionally, such loose fit may be provided between the mounting bolts and the support channel to permit the latter to rotate with respect to the former, also presenting new wear surfaces.

5 Claims, 6 Drawing Figures

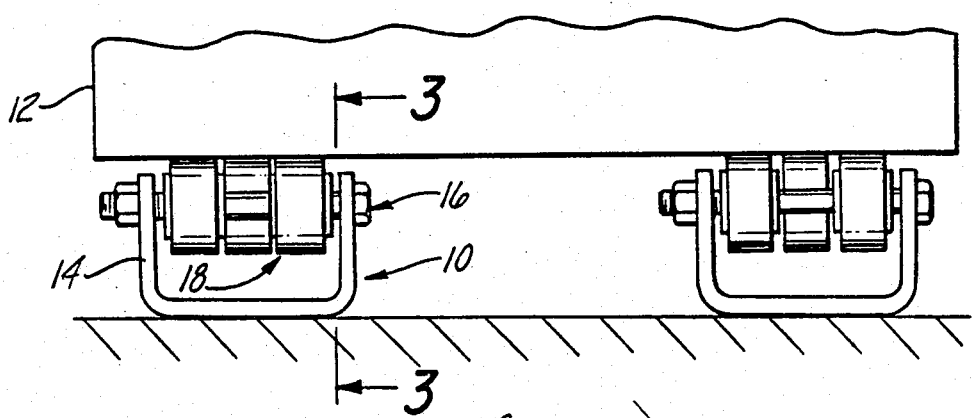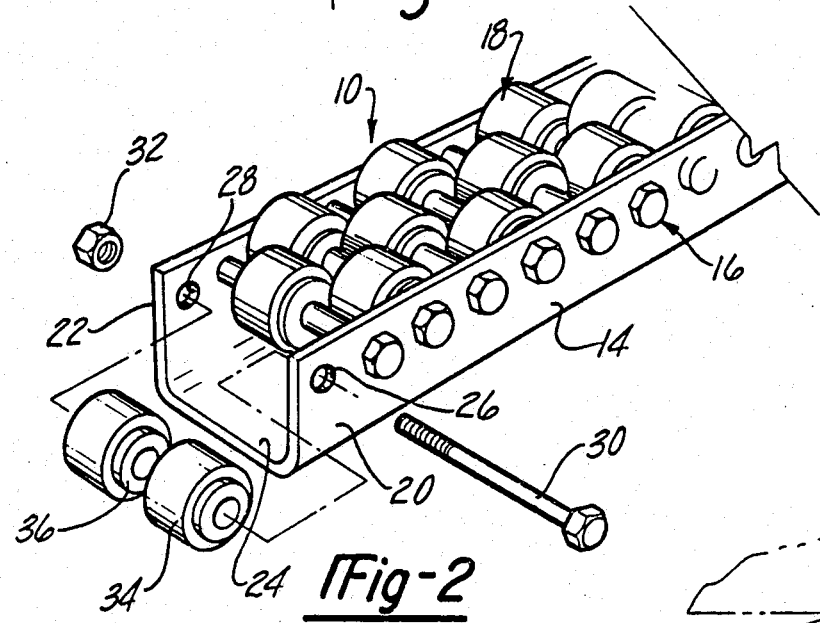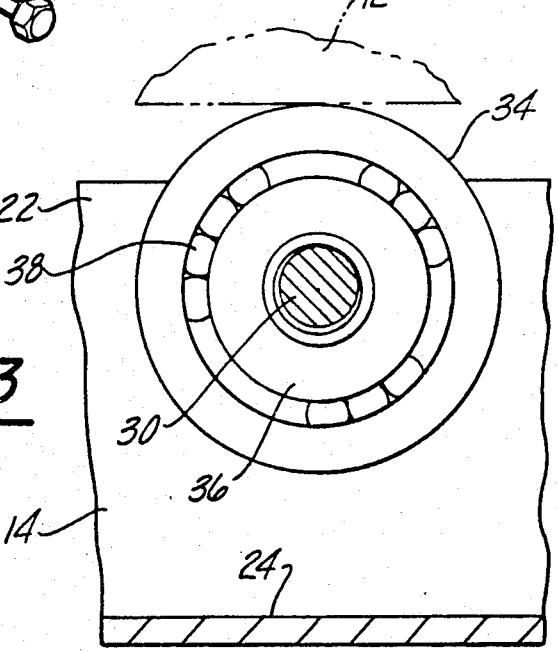

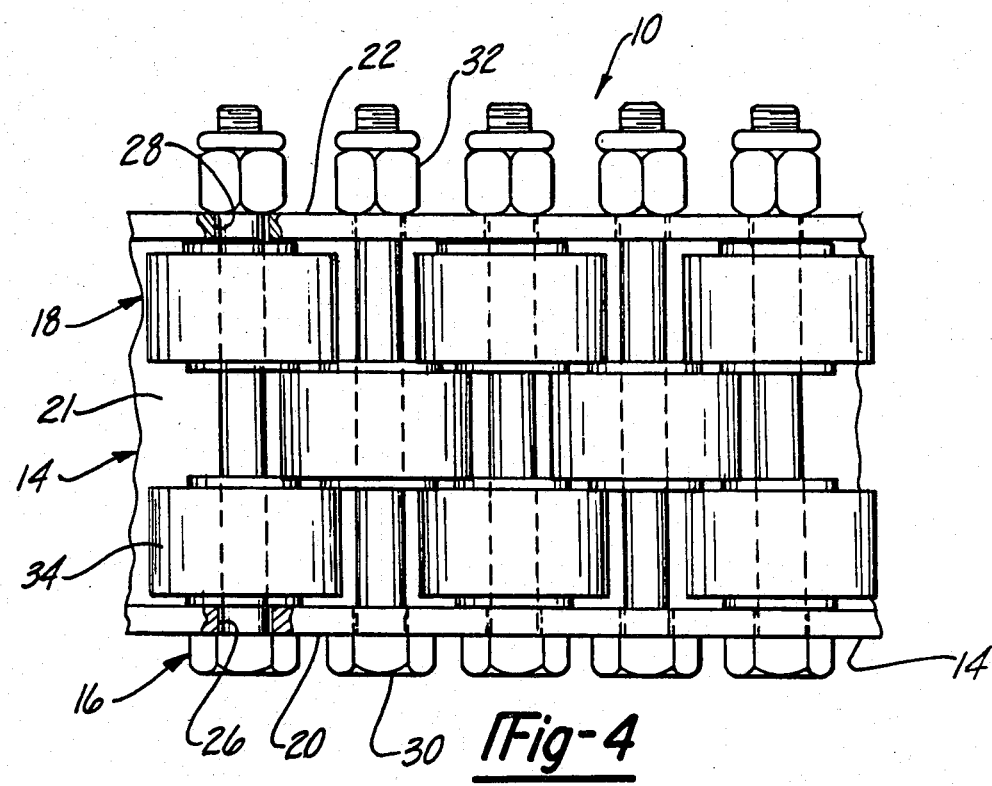
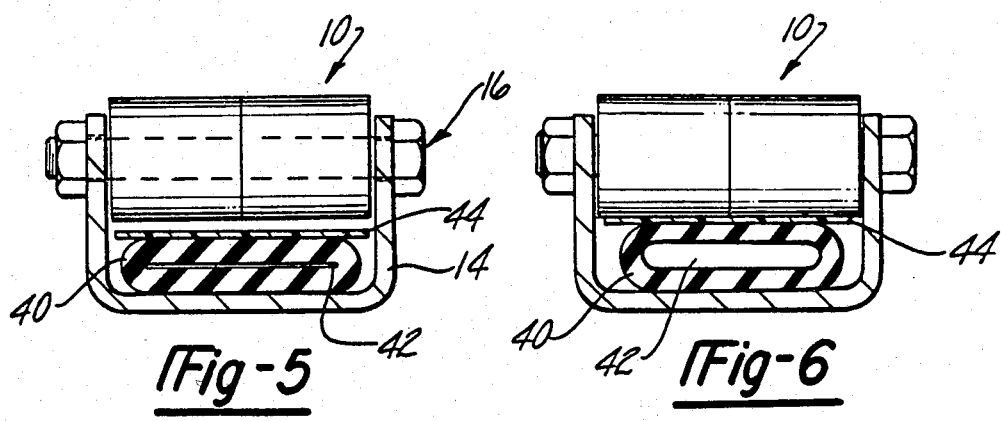

MATERIAL FLOW RAIL

This is a division of application Ser. No. 575,769, filed Feb. 1, 1984, now U.S. Pat. No. 4,541,518.

BACKGROUND AND SUMMARY OF THE INVENTION

This invention relates to material handling equipment and particularly to an improved material flow rail assembly.

Material flow rails are employed in numerous situations wherein material either in assembled units or in holding bins are transferred from one location to another. Such devices are often found in factories, warehouses and retail outlets. The type of material flow rail to which this invention relates is the type wherein parts are caused to move by the force of gravity. Therefore, it is necessary to provide a downward slope to the rail thereby providing an urging force to move the materials along the rail.

In certain applications it is desireable to provide a material flow rail which may be employed with components or bins having very small contact or "footprint" areas. Material flow rails according to the prior art employ roller assemblies having a relatively small contact area and which are spaced far apart such that the parts to be transported by the rail must have a large, substantially flat footprint surface. It is therefore desireable to provide a material flow rail which may transport materials having small footprint areas. Cost is always a concern for equipment in commercial use, therefore it is desirable to provide a material flow rail which can be constructed and operated at the lowest possible cost. Reliability and repairability are also primary considerations in the selection of industrial and commercial equipment. In certain applications, it is necessary to provide a material flow rail which has a low vertical profile, thereby maximizing the number of such rails and spaces for container movement which may be provided within a given vertical area. Finally, it is preferable in applications wherein very heavy or high density objects are being transported to provide a material flow rail which has sufficient structural integrity to handle such objects which will provide excellent durability in such usage conditions.

It is accordingly a principal aspect of this invention to provide an improved material flow rail which can transport components or component bins having small footprint contact areas, which is low in cost, reliable and easy to maintain. It is a further aspect of this invention to provide a material flow rail which has a very low vertical profile and further which has the capacity to handle extremely heavy and high density components.

The above principal aspects of this invention are provided by a material flow rail featuring a plurality of low profile roller assemblies which are very closely spaced both laterally and longitudinally with respect to the longitudinal axis of the rail, thereby accomodating small footprint area components and heavy objects. The improved material flow rail according to this invention employs conventional roller bearings wherein the outer race of the bearing forms the contacting surface with which the materials being transported interfaces. The use of such components which are readily available contributes to a low overall cost for the material flow rail. Reliability is provided by loosely supporting the inner races of the bearing assemblies with a conventional bolt. Providing such loose engagement permits the inner race to rotate with respect to the bolt during use thereby presenting a new contacting surface between the inner race and the bolt. Such renewable contacting surfaces may also be provided between the bearing supporting bolt and the supporting channel. Low cost and ease of maintenance is further provided by the construction according to this invention wherein an individual bearing assemblies of the material flow rail are positioned by adjacent bearing assemblies such that spacers on the supporting bolts are not required to locate the bearing assemblies laterally.

Additional benefits and advantages of the present invention will become apparent to those skilled in the art to which this invention relates upon a reading of the described preferred embodiments of this invention taken in conjunction with the accompanying drawings.

DESCRIPTION OF THE DRAWINGS

FIG. 1 is a front view of a pair of improved material flow rails according to this invention showing a workpiece supported by the rails.

FIG. 2 is a perspective view of a portion of an improved flow rail according to this invention illustrating the manner in which the individual bearing assemblies are supported by the support channel.

FIG. 3 is a cross-sectional view taken along line 3—3 of FIG. 2 showing an individual bearing assembly as it is mounted to the associated mounting bolt assembly.

FIG. 4 is a top view of the material flow rail according to this invention.

FIG. 5 is a end view in elevation of a rail according to this invention showing a braking system in a non-energy condition which may be employed to control the transport of material along the material flow rail.

FIG. 6 is a front elevational view of the improved rail according to this invention showing the braking assembly in an energized condition.

DETAILED DESCRIPTION OF THE PREFERRED EMBODIMENTS

The improved material flow rail according to this invention is particularly illustrated by FIGS. 1, 2 and 4 and is generally designated by reference character 10. As shown by FIG. 1, a plurality of such rails are arranged to support an article 12 as it is being transported from one location to the next. The primary components of the material flow rail 10 are support channel 14, mounting bolt assembly 16 and bearing assemblies 18.

Support channel 14 is a generally U-shaped metal channel having upstanding leg sections 20 and 22 which are innerconnected by floor section 24. Support channel 14 may be constructed in any convenient length and is shown by FIG. 2 as broken away from the remainder of its length. It is only necessary for a clear understanding of this invention, however, to describe a short longitudinal distance along the channel in order to fully describe the entire channel assembly since the configuration is repetitive. A plurality of regularly spaced bores 26 and 28 are formed in upstanding leg sections 20 and 22 respectively and are arranged along a line extending in the direction of the longitudinal axis of channel 14.

Mounting bolt assemblies 16 are composed of threaded bolt 30 and nut 32. Bolt 32 has a sufficient axial length such that it extends between upstanding leg sections 20 and 22 through bores 26 and 28. Nut 32 is preferably of the self-locking variety such that it may be tightened onto bolt 30 and will not tend to become loosened by vibration or rotation of the bolt during use. Threaded bolt 30 preferably forms threads over a limited extent of its extreme end thereby providing a relatively smooth cylindrical outer surface in the region between upstanding leg sections 20 and 22.

Bearing assemblies 18, particularly shown by FIGS. 2 and 3, include outer race 34 and inner race 36, separated by rolling bearing elements 38. Bearing assemblies 18 are characterized in that inner race 36 extends in a lateral direction along bolt assembly 16 an extent somewhat greater than the lateral extent of outer race 34. This lateral extent of the inner race is best shown with reference to FIG. 4. The outer circumferential contacting surface between bearing assemblies 18 and article 12 is the outer surface of outer race 34. Unlike many prior art material flow rails, the rail according to this invention system does not employ a separate annular element connected to the bearing outer race which contacts the container to be transported. Such configuration provides a low profile enabling a number of flow rails 10 to be provided within a given vertical distance.

Assembly of the flow rail is best shown by FIG. 2 wherein a first bolt assembly supports two spaced bearing assemblies 18. A second bolt assembly is then installed and supports only one bearing assembly 18. This pattern is repeated until the desired longitudinal length of rail 10 is readied. By locating bolts 18 in close proximity with one another, adjacent bearing assemblies 18 act to separate bearing assemblies riding on other bolts. Such result is achieved by spacing bolt assembly 16 apart a distance which does not exceed the outside diameter of outer race 34. As viewed from above, as in FIG. 4, it can be seen that the lateral extent of inner race 36 acts to separate the outer races of adjacent bearing assemblies 18 in a lateral direction and also serves to create a clearance between a bearing assembly outer race and leg sections 20 and 22. The lateral distance between upstanding leg sections 20 and 22 is chosen to slightly exceed the lateral distance of the interlocking bearing assemblies thus providing clearance for free rotation of outer races 34. The dense packing of adjacent bearing assemblies 18 permits rail 10 to be employed to transport extremely heavy articles, since the articles' weight becomes distributed over a large number of individual bearings.

As is evident from FIG. 3, the diameter of bolt 30 is somewhat less than the internal diameter of inner race 36. By providing such loose fit, inner race 36 is permitted to slowly rotate with respect to bolt 30, such that a particular surface of the inner race is not subjected to constant pressure and wear, either along the contact surface with bolt 30 or the surface of inner race 36 which is acted upon by rolling bearing elements 38. Therefore, as articles are caused to be transmitted by flow rail 10, inner race 36 is permitted to slowly rotate, which rotation is facilitated by the slight degree of friction occurring between inner and outer races 34 and 36, and rolling elements 38. Providing such relative rotation also provides an advantage in the event that a bearing assembly 18 becomes frozen, occurring, for example, when foreign matter prevents free movement of bearing elements 38. In such conditions bearing assembly 18 will be permitted to rotate about bolt 30.

In addition to providing a loose fit between inner race 36 and bolt 30, such fit may also be provided between bolt 30 and bores 26 and 28, thereby permitting bolt assembly 16 to rotate with respect to support channel 14, thereby leading to the presentation of new wear surfaces as the flow rail is being used. Such clearance fit is shown in the partially sectioned portions of FIG. 4. It would, of course, be necessary for the successful implementation of such arrangements to avoid tightening nut 32 to the extent that it would clamp leg sections 20 and 22 together, thereby preventing free rotation of mounting bolt assembly 16.

As is evident from FIG. 4, articles having very small "footprint" areas could be transmitted by material flow rail 10. For example, a table having four substantially vertical legs could be caused to be transmitted by flow rail 10 by guiding the table such that the bottom surface of each leg rides along the rail. This result occurs because of the close spacing between adjacent bearing assemblies 18 in both the longitudinal and lateral directions with respect to support channel 14 and further owing to the lateral width of outer race 34.

FIGS. 5 and 6 illustrate a braking system which may be conveniently employed with the improved material flow rail 10 according to this invention. This braking system includes a flexible hose member 40 which assumes a substantially flattened configuration as illustrated by FIG. 5. By causing the pressure of the internal cavity 42 of hose 40 to be increased, the hose is caused to assume the inflated shape shown by FIG. 6, thereby exerting a contact force against outer races 34. This action leads a high degree of friction against rotation of outer races 34 thereby causing a braking effect. In order to enhance the durability of the braking system and/or to prevent contaminating materials from coming in contact with hose member 40 wear pad 44 may be interposed between the hose member and inner race 36. In instances where a very long length of flow rail 10 is employed for which the likelihood of heavy containers gaining an excessive speed is presented, a means for pulsing fluidic pressure to internal cavity 42 of hose member 40 may be provided. For such applications, a short duration of applied pressure would be followed by a short duration where a hose internal member 42 is evacuated.

While preferred embodiments of the invention have been described herein, it will be appreciated that various modifications and changes may be made without departing from the spirit and scope of the appended claims.

I claim:

1. A material flow rail for transmitting articles by gravity comprising:
   a support channel forming upstanding leg sections extending along a longitudinal axis, said leg sections forming a plurality of bores;
   a plurality of bolt assemblies extending between said upstanding leg sections and passing through said leg section bores, said bolt assemblies oriented transversely with respect to said longitudinal axis, and bearing assemblies loosely supported on said bolt assemblies having an inner race and an outer race and rolling bearing elements interposed therebetween, said bolt assemblies spaced in the direction of said support channel longitudinal axis a distance less than the outer diameter of said outer races such that said bearing assemblies are overlapping in said longitudinal direction; and
   means for providing contact between a first one of said bearing assemblies and a second one of said bearing assemblies for transmitting lateral forces between said first and second bearing assemblies, the transmission of said lateral forces thereby determining the relative transverse position of said second bearing assembly with respect to said first bearing assembly.

2. The material flow rail according to claim 1 further comprising braking means for impeding the rotation of said bearing assemblies.

3. The material flow rail according to claim 1 further comprising braking means disposed in said support channel for selectively impeding the rotation of said bearing assemblies.

4. The material flow rail according to claim 1 further comprising braking means confined by said support channel and responsive to fluidic pressure to either expand to cause contact with said outer races thereby causing a braking effect on said outer races, or to contract to remove said braking effect.

5. The material flow rail according to claim 1 further comprising a flexible hose member disposed substantially within said support channel and having means for coupling to a source of fluidic pressure;

said hose member normally assuming a substantially flattened cross-sectional configuration and being spaced apart from said outer races;

said hose member assuming a substantially inflated cross-sectional configuration in response to the introduction of fluidic pressures and being in direct contact with said outer races, said direct contact causing substantial frictional forces between said outer races and said hose member to thereby cause a braking effect.

* * * * *